T. PRICE.
LAWN MOWER.
APPLICATION FILED APR. 13, 1912.
1,144,244.
Patented June 22, 1915.
2 SHEETS—SHEET 1.
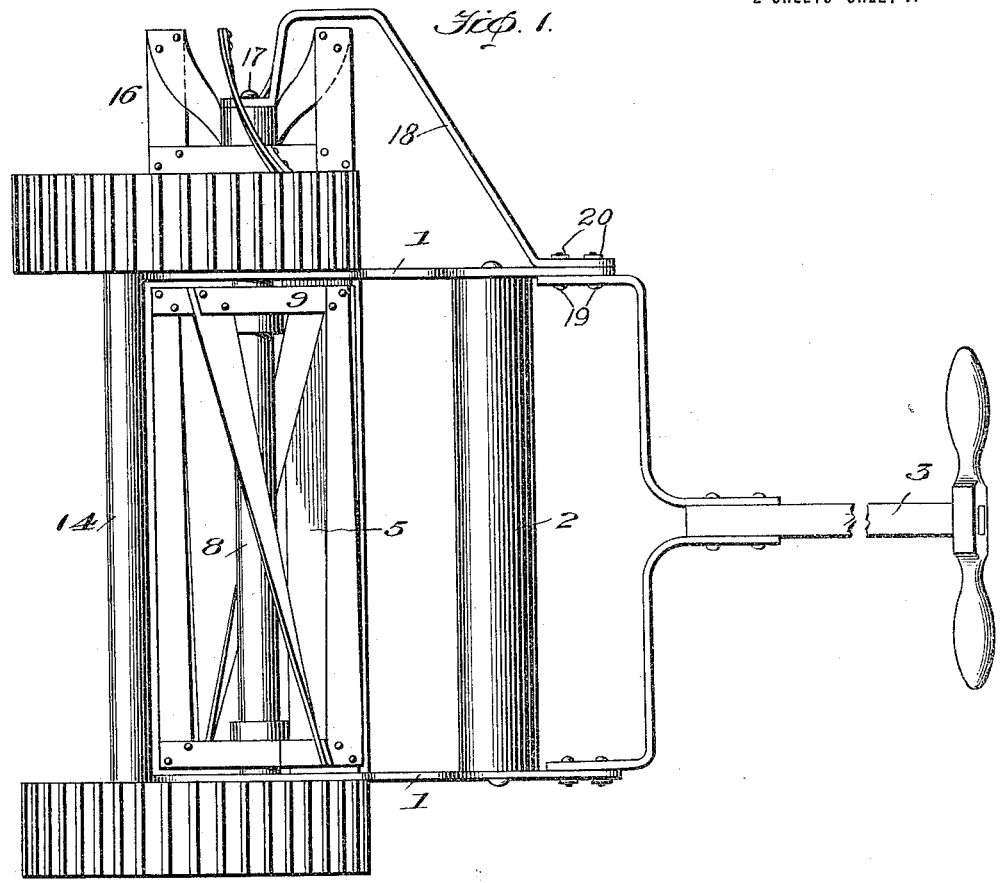
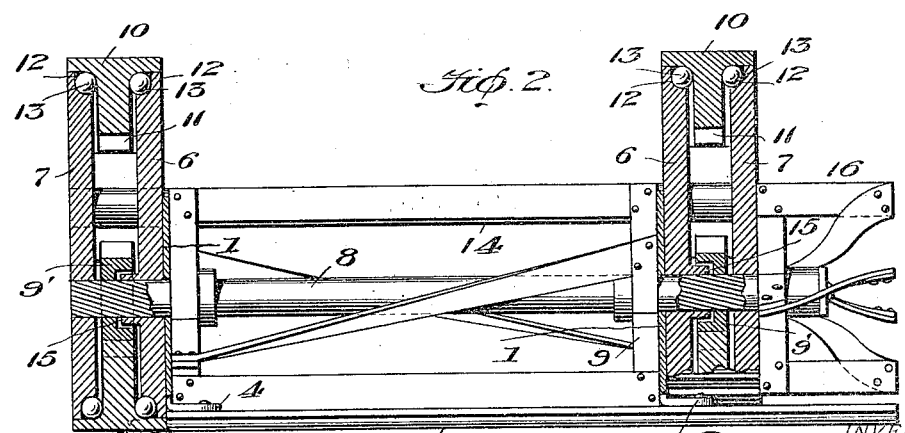

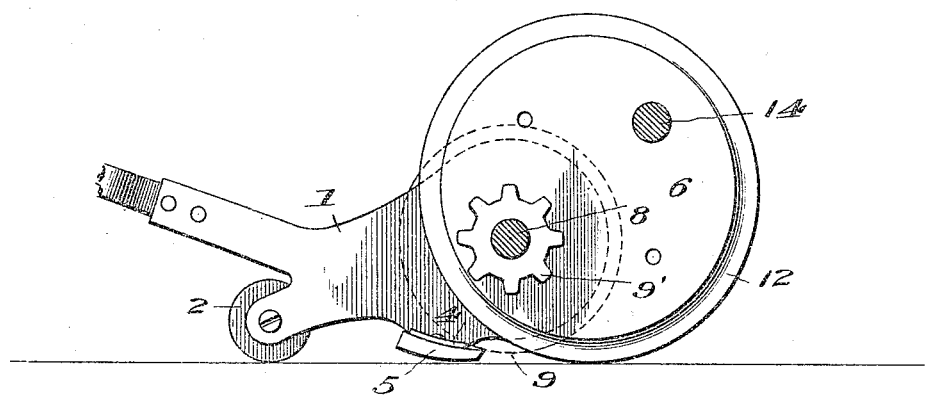
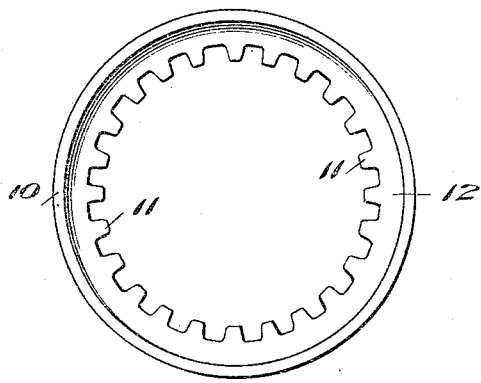
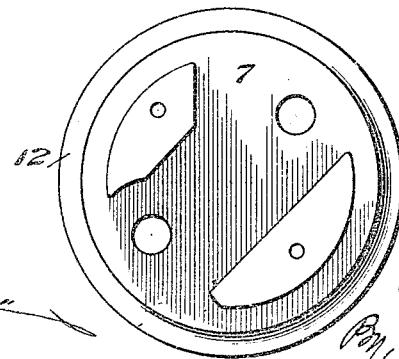

UNITED STATES PATENT OFFICE.

TWIGGS PRICE, OF BUCYRUS, OHIO.

LAWN-MOWER.

1,144,244.  Specification of Letters Patent.  Patented June 22, 1915.

Application filed April 13, 1912. Serial No. 690,557.

*To all whom it may concern:*

Be it known that I, TWIGGS PRICE, a citizen of the United States, residing at Bucyrus, in county of Crawford and State of Ohio, have invented certain new and useful Improvements in Lawn-Mowers, of which the following is a specification.

My invention relates to an improvement in lawn mowers and the object is first to provide means for trimming under hedges and shrubbery and the borders of sidewalks, and flower beds. Second, to provide a light running machine in which the gearing is greatly reduced and simplified in parts so that there are comparatively few to wear out or get out of order.

With these objects in view my present invention comprises a mechanism in which the rims only of the traction wheels revolve, they being internally toothed to mesh with the gear wheels on the cutter shaft and being boxed in at the sides by means of stationary plates, between which and the traction rims ball bearings are confined to reduce friction of parts to a minimum and to produce a light easy running lawn mower.

My invention further consists of certain novel features of construction and combinations of parts which will be hereinafter more fully described and pointed out in the claim.

In the accompanying drawings—Figure 1 is a plan view. Fig. 2 is a transverse sectional view through the cutter shaft and gearing. Fig. 3 is an end view with the near wheel rim removed. Fig. 4 is a view of the wheel rim. Fig. 5 is an interior view of one of the wheel disks or plates.

The numerals 1, 1 indicate the side plates or casings of the lawn mower, the same being forked at the rear to receive the ground roller 2 and the handle 3, and at the lower side having lugs 4, 4 by means of which the stationary cutter bar 5 is secured to the machine, the same extending out at the right side beyond the outer wheel for a purpose to be hereinafter explained.

The inner disks or plates 6, 6 of the ground wheels are rigidly secured to the plates or castings 1, 1 they, of course, being stationary, as are also their companion disks or plates 7, 7 and the central shaft 8 of the cutter cylinder 9 is journaled in these disks or plates 6, 6 and 7, 7, they having pinions 9', 9' keyed thereon in the space between the plates or disks and the rotary wheel rims 10, 10 are provided with internal toothed flanges 11, 11, said teeth meshing with those of the pinions whereby to drive the cutter cylinder as the wheel rims turn in the movement of the lawn mower upon the ground and to reduce friction to a minimum ball races 12 and ball bearings 13, 13 are formed between the wheel rims and the disks or plates as illustrated. A guard rod 14 extends through the disks or plates 6, 6 and 7, 7 and through the wheel rims forward of the cutter cylinder. The usual flanges 15, 15 are provided as a means for permitting the lawn mower to be reversed or pulled back while automatically clutching in the cutter cylinder when the mower is pushed forward. One or both ends of the shaft 8 of the cutter cylinder protrude beyond the outer wall disks or plates 7, 7 and inner wall disks 6, 6, and on one of these protruding ends the trimmer cylinder 16 is removably secured, its knives coöperating with the projecting end of the cutter bar 5 previously alluded to.

When not required, the cutter cylinder or cylinders 16 may be removed by unscrewing the nut or screw 17 at the outer end of the shaft and sliding it off. A bracket 18 is connected to one of the plates 1 by means of bolts 19, 19, and nuts 20, 20. The other terminal of this bracket engages the end of the cutter-shaft 8 and bears against the hub of the auxiliary cutter 16 for maintaining the cutter upon the cutter-shaft 8. The screw 17 passes through the bracket and has screw-threaded engagement with the shaft 8 for fastening the bracket in position whereby the auxiliary cutter is held upon the shaft and a support is formed for the end of the shaft by the bracket. Its use, however, is very desirable as in this way it is possible to cut or trim the grass in places where the regular lawn mower knives will not reach on account of the wheels being inside. In this way an auxiliary cutter is provided outside of the wheel or wheels, thus making it convenient to trim the grass under shrubbery, around trees and along the edges of sidewalks and driveways.

More or less slight changes might be made in the form and arrangement of the several parts described without departing from the spirit and scope of my invention and hence I do not wish to limit myself to the exact construction herein set forth, but—

Having fully described my invention, what I claim as new and desire to secure by Letters Patent is—

In a lawn mower, the combination with a frame, of inner and outer wheel disks, the inner disks fastened to the frame, a guard rod connecting the inner and outer disks together, a cutter shaft journaled in and projecting through the disks carrying a cutter cylinder between the inner disks and an auxiliary cutter removably mounted on the shaft adjacent to one of the outer disks, a bracket connected to the frame having one end thereof engaging an end of the cutter-shaft for holding the auxiliary cutter in place, a screw passing through the bracket and into the shaft for fastening the bracket to the shaft, and wheel rims mounted on the disks having internal toothed flanges, gear wheels on the cutter shaft located between the disks and meshing with teeth of the flanges, lugs on the frame located beyond the wheels, and a cutter bar connected to the lugs adapted to coöperate with both the main and auxiliary cutter.

In testimony whereof I affix my signature, in the presence of two witnesses.

TWIGGS PRICE.

Witnesses:
 ROSCOE PRICE,
 H. F. MILLER.

Copies of this patent may be obtained for five cents each, by addressing the "Commissioner of Patents, Washington, D. C."